United States Patent
Kister et al.

(10) Patent No.: US 9,086,260 B2
(45) Date of Patent: Jul. 21, 2015

(54) PYROTECHNIQUE RUPTURE METHOD AND COMPONENTS FOR IMPLEMENTING IT

(71) Applicant: ASTRIUM SAS, Suresnes (FR)

(72) Inventors: Thomas Kister, Vaux Sue Seine (FR); Luc Preaud, Gargenville (FR)

(73) Assignee: ASTRIUM SAS, Suresnes (FR)

( * ) Notice: Subject to any disclaimer, the term of this patent is extended or adjusted under 35 U.S.C. 154(b) by 0 days.

(21) Appl. No.: 14/362,184

(22) PCT Filed: Nov. 26, 2012

(86) PCT No.: PCT/FR2012/052720
§ 371 (c)(1),
(2) Date: Jun. 2, 2014

(87) PCT Pub. No.: WO2013/083898
PCT Pub. Date: Jun. 13, 2013

(65) Prior Publication Data
US 2014/0331851 A1    Nov. 13, 2014

(30) Foreign Application Priority Data
Dec. 7, 2011   (FR) ..................... 11 03744

(51) Int. Cl.
| | |
|---|---|
| *F42B 15/36* | (2006.01) |
| *F42B 3/00* | (2006.01) |
| *B64G 1/64* | (2006.01) |
| *F42B 15/38* | (2006.01) |
| *C06C 5/04* | (2006.01) |

(52) U.S. Cl.
CPC ................ *F42B 15/36* (2013.01); *B64G 1/645* (2013.01); *C06C 5/04* (2013.01); *F42B 15/38* (2013.01)

(58) Field of Classification Search
CPC .......... F42B 15/36; F42B 15/38; F42B 3/006; F42D 1/04; F42D 1/043; F42D 5/00; F42D 3/00; F15B 15/19; B23D 15/145
USPC ........... 102/275.1, 275.8, 377; 89/1.812, 1.14
See application file for complete search history.

(56) References Cited

U.S. PATENT DOCUMENTS

| | | | | |
|---|---|---|---|---|
| 2,959,129 | A * | 11/1960 | Warren | 403/31 |
| 3,311,056 | A * | 3/1967 | Noddin | 102/275.8 |
| 4,106,875 | A * | 8/1978 | Jewett | 403/2 |
| 4,432,268 | A * | 2/1984 | Miller | 86/1.1 |
| 5,129,306 | A * | 7/1992 | Fauvel | 89/1.14 |
| 5,535,502 | A * | 7/1996 | Harris | 29/527.1 |
| 5,585,596 | A * | 12/1996 | Richards et al. | 102/378 |
| 6,125,762 | A * | 10/2000 | Fritz et al. | 102/378 |
| 6,298,786 | B1 * | 10/2001 | Grosskrueger et al. | 102/378 |
| 6,739,265 | B1 * | 5/2004 | Badger et al. | 102/275.3 |
| 7,127,994 | B2 * | 10/2006 | Cleveland | 102/378 |
| 8,727,654 | B2 * | 5/2014 | Graham | 403/2 |
| 2006/0201316 | A1 * | 9/2006 | Kister | 89/1.14 |
| 2012/0061520 | A1 * | 3/2012 | Graham | 244/173.2 |
| 2013/0233161 | A1 * | 9/2013 | Kametz et al. | 89/1.14 |

* cited by examiner

*Primary Examiner* — Bret Hayes
*Assistant Examiner* — Derrick Morgan
(74) *Attorney, Agent, or Firm* — Duane Morris LLP; J. Rodman Steele, Jr.; Gregory M. Lefkowitz

(57) ABSTRACT

According to the invention, the component to be ruptured comprises an alternation of oblong pre-cut zones and of non-pre-cut zones and the pyrotechnique rupture device (1) with detonating cord (2) comprises an alternation of sections (1.1) for rupturing said non-pre-cut zones and of inflatable sections (1.2) for parting the broken parts of said component.

8 Claims, 2 Drawing Sheets

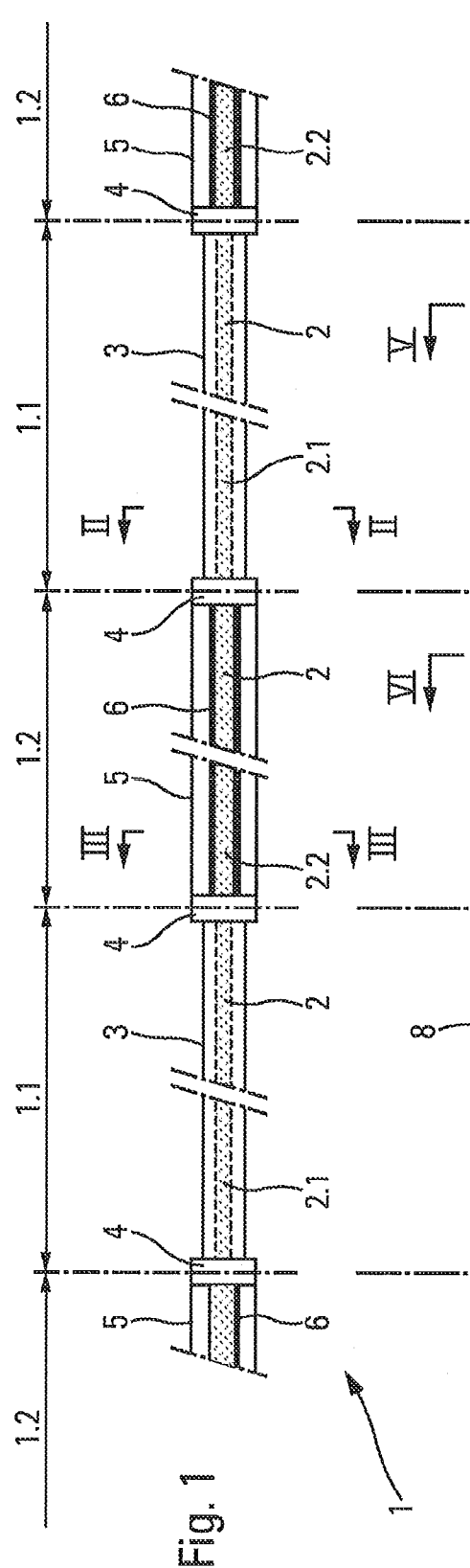
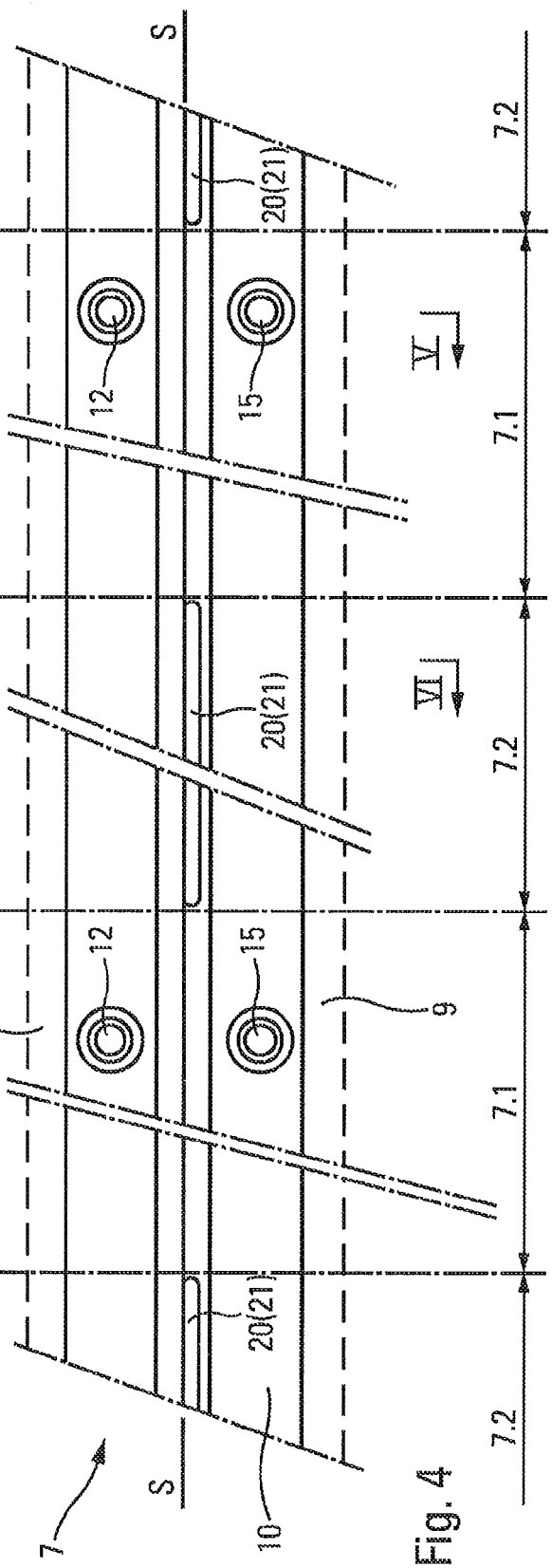

PYROTECHNIQUE RUPTURE METHOD AND COMPONENTS FOR IMPLEMENTING IT

CROSS-REFERENCE TO RELATED APPLICATIONS

This application is a §371 national stage entry of International Application No. PCT/FR2012/052720, filed Nov. 26, 2012, which claims priority to French Patent Application No. 1103744 filed Dec. 7, 2011, the entire contents of which are incorporated herein by reference.

The present invention relates to a method for the pyrotechnic separation of two elements secured to one another by a pyrotechnic rupture securing component, and to such a component for carrying out this method.

Although not exclusively suitable for use in space launch vehicles, the invention will hereafter be more particularly described in the latter application.

It is known that some elements of space launch vehicles, such as adjacent stages, are mechanically linked together by a securing component which is intended to transmit mechanical forces between said elements as necessary and which is provided with pyrotechnic detonation rupture means incorporated into said component and able to break the latter along a predetermined separation plane, when said elements have to be separated from one another. Similar securing components also make it possible to cut the supporting structures and satellite protection boxes on board launch vehicles.

In the known pyrotechnic separation methods, the rupture of the securing component is generally carried out correctly. However, following the rupture of the securing component, these known methods do not always ensure in a satisfactory manner that the two broken parts of the securing component come apart, and the elements thus separated are removed.

The object of the present invention is to overcome this drawback by dissociating the cutting and removal functions.

To this end, according to the invention, the method for the pyrotechnic rupture of a securing component between two elements, wherein the securing component:
- is intended to transmit mechanical forces between said elements as necessary, and
- comprises a pyrotechnic rupture device having a detonating cord which is incorporated into said securing component and able to break the latter along a predetermined separation plane when said elements have to be separated from one another is remarkable:
  - in that oblong pre-cut zones are formed in said securing component, along said predetermined separation plane, and spaced apart from one another so as to form an alternating sequence of such oblong pre-cut zones and non-pre-cut zones which transmit mechanical forces between said elements; and
  - in that said pyrotechnic rupture device is arranged such that:
    - in each of said non-pre-cut zones, said pyrotechnic rupture device comprises a detonating cord section arranged in an expansion tube, and
    - in each of said pre-cut oblong zones, said pyrotechnic rupture device comprises a detonating cord section enclosed in a sealed manner in an inflatable sheath.

Thus, when the detonating cord is lit:
- the detonating cord sections associated with expansion tubes break said non-pre-cut zones, so that said securing component is separated into two parts along said predetermined separation plane, and
- the detonating cord sections associated with inflatable sheaths inflate the latter with the gases they generate, so that said sheaths part said parts of the broken securing component from one another and, therefore, move away from one another said elements to which said parts are respectively rigidly connected.

In order to further enhance this parting effect produced by the detonating cord sections associated with inflatable sheaths, it is advantageous that, in the sections of the pyrotechnic rupture device corresponding to said pre-cut oblong zones of said securing component, a deflagrating cord which is enclosed in a sealed manner in said inflatable sheath is arranged around said section of the detonating cord.

Thus, upon ignition of the detonating cord, the deflagrating cords are also ignited, producing a large amount of combustion gases which help to inflate the inflatable sheaths and, therefore, to move said elements apart.

The present invention also relates to a pyrotechnic rupture securing component comprising, on the one hand, along a predetermined separation plane, an alternating sequence of oblong pre-cut zones and non-pre-cut zones which transmit mechanical forces between said elements and, on the other hand, a pyrotechnic rupture device comprising:
- in each of said non-pre-cut zones, a section of detonating cord arranged in an expansion tube, and
- in each of said pre-cut oblong zones, a section of detonating cord enclosed in a sealed manner in an inflatable sheath.

For the reason mentioned above, it is advantageous that, in said pre-cut oblong zones of the securing component of the invention, said pyrotechnic rupture device comprises a deflagrating cord which is enclosed in a sealed manner in said inflatable sheath and which is arranged around the corresponding section of detonating cord.

In a known method, the pyrotechnic rupture securing component may comprise two wings which define between them a groove in which said pyrotechnic rupture device is housed, said groove being closed on the side of one of said elements by a bottom and, on the side of the other of said elements, by this other element itself, and said wings may include, in the vicinity of said bottom, pre-established rupture zones defining said predetermined separation plane.

In this case, in said pre-cut oblong zones, each of said wings comprises, according to the invention, an oblong opening at the level of said pre-established rupture zones and said bottom of the groove.

In order to produce such a pyrotechnic rupture securing component, a profile comprising two wings defining between them a groove can be used which, on one side, is closed by a bottom and, on the other, is open, said wings comprising pre-established rupture zones in the vicinity of said bottom and each of said wings comprising a series of spaced oblong openings at the level of said pre-established rupture zones and of said bottom of the groove, and each oblong opening of one of said wings being located opposite an oblong opening of the other of said wings.

Associated with such a profile, according to the present invention, is a pyrotechnic rupture device having a detonating cord and comprising, in alternation, sections of detonating cord which are each arranged in an expansion tube, and sections of detonating cord which are each enveloped in a sealed manner in an inflatable sheath, wherein these last sections of detonating cord may each comprise a deflagrating cord arranged inside said inflatable sheath around said detonating cord.

The figures of the appended drawing will explain how the invention may be carried out. In these figures, identical reference numbers denote similar elements.

FIG. 1 illustrates diagrammatically and partially an embodiment of the pyrotechnic rupture device having a detonating cord according to the present invention.

FIG. 4 is a partial diagrammatic front view of a securing component according to the present invention, at which the pyrotechnic rupture device of FIG. 1 is incorporated.

Figure 2:
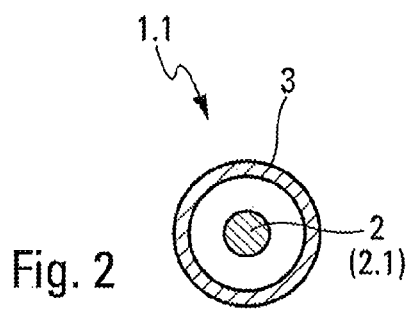
FIGS. 2 and 3 are diagrammatic sections along lines II-II and III-III of FIG. 1 respectively.
Figure 3:
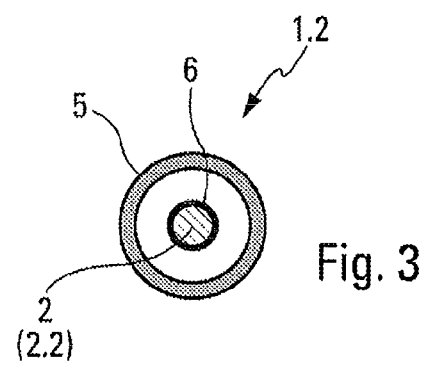
Figure 5:
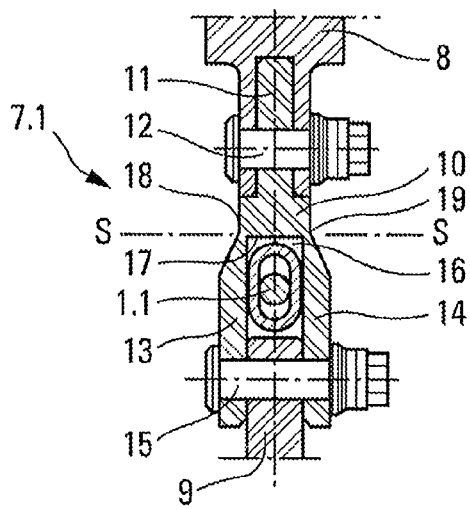
FIGS. 5 and 6 are sections along lines V-V and VI-VI of FIG. 4 respectively.
Figure 6:
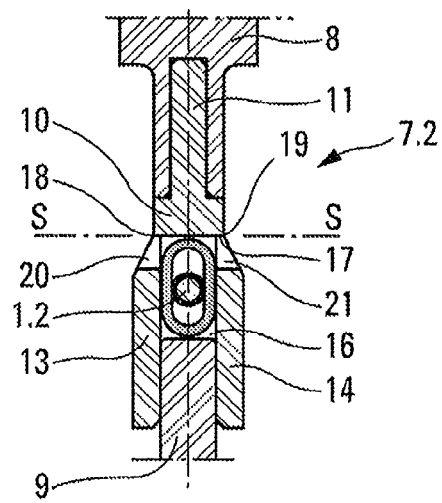
Figure 7:
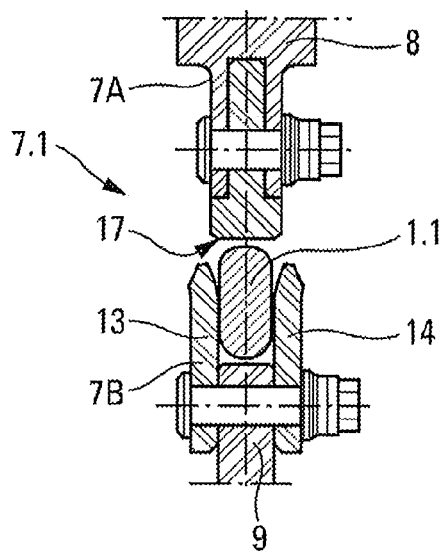
Figure 8:
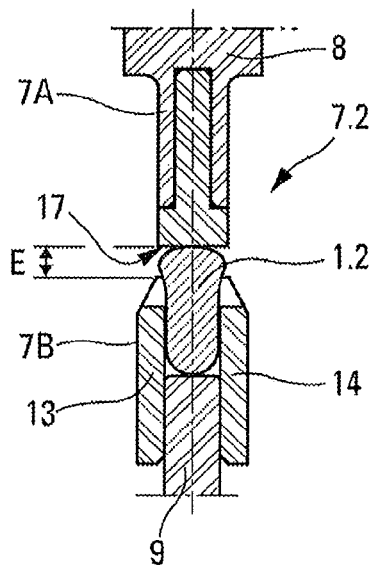

FIGS. 7 and 8, which correspond to FIGS. 5 and 6 respectively, show the result of igniting the pyrotechnic rupture device of FIGS. 1 to 3.

The pyrotechnic rupture device 1 according to the present invention and shown by FIGS. 1, 2 and 3 comprises a detonating cord 2 which is formed in one piece by a plurality of portions placed end to end.

Along the detonating cord 2, the pyrotechnic rupture device 1 is formed by an alternation of sections 1.1 and 1.2.

Each section 1.1, which is intended to cause a rupture, comprises a section 2.1 of detonating cord 2 enclosed in an expansion tube 3.

Each section 1.2, which is intended to inflate, comprises a section 2.2 of detonating cord 2 enclosed in a sealed manner, owing to joints 4, in an inflatable sheath 5. A deflagrating cord 6, arranged around section 2.2 of detonating cord, may additionally be enclosed in a sealed manner in the inflatable sheath 5.

The pyrotechnic rupture securing component 7, according to the present invention and shown by FIGS. 4, 5 and 6, is intended to provide mechanical strength between two elements 8 and 9, for example consecutive stages of a space launch vehicle, but able to be broken on command along a predetermined separation plane S.S.

This securing component 7 comprises a profile 10 which is provided, on one side, with a lug 11 which serves to secure said profile 10 to the element 8 by means of bolts 12 and, on the other side, with two wings 13 and 14 which are used to secure said profile 10 to the element 9 by means of bolts 15.

The two wings 13 and 14 are at least approximately parallel and they define, between them, an open groove 16 which is closed, on the side of the element 8, by a bottom 17 which is formed at the connection of the lug 11 and the wings 13 and 14 and, on the side of the element 9, by this element 9 itself penetrating into the open end of said groove.

At the connection of the lug 11 and the wings 13 and 14, that is to say in the vicinity of the bottom 17, the latter comprise pre-established rupture zones 18 and 19, for example formed by zones of lesser thickness, defining the predetermined separation plane S.S.

Furthermore, in said profile 10, opposite oblong pre-cut openings 20, 21 are formed respectively in said wings 13 and 14, at the level of the pre-established rupture zones 18, 19 and the predetermined separation plane.

The pairs of oblong pre-cut openings 20, 21 are spaced apart from one another along the profile 10, so that said securing component 7 is provided with an alternation of non-pre-cut zones 7.1 which transmit mechanical forces between the elements 8 and 9, and oblong pre-cut zones 7.2, each delimited by a pair of oblong openings 20, 21.

Inside the groove 16 of the profile 10, the pyrotechnic rupture device 1 is arranged such that each of its rupture sections 1.1 is located in a non-pre-cut zone 7.1 of the securing component and that each of its inflatable sections 1.2 is located in a pre-cut zone 7.2 of said component. As is shown in FIGS. 5 and 6, the pyrotechnic rupture device 1 is inserted into the groove 16 using force, with deformation of said sections 1.1 and 1.2 thereof.

Thus, on igniting the detonating cord 2:
the rupture sections 1.1 of the pyrotechnic rupture device 1 cause the cutting of the non-pre-cut zones 7.1 of the component 7 (see FIG. 7), which is thus cut into two components 7A and 7B, and
the inflatable sections 1.2 of said pyrotechnic rupture device 1 are inflated by the gases generated by sections 2.2 of the cord 2 and by the deflagrating cords 6 and cause the parting E of said cut components 7A and 7B by support between said parts 7A and 7B (see FIG. 8).

The invention claimed is:

1. Method for the pyrotechnic rupture of a securing component (7) between two elements (8,9), wherein the securing component:
is intended to transmit mechanical forces between said elements (8,9) as required, and
comprises a pyrotechnic rupture device (1) having a detonating cord (2) which is incorporated into said securing component (7) and able to break the latter along a predetermined separation plane (S.S) when said elements (8,9) have to be separated from one another, wherein:
oblong pre-cut zones (7.2) are formed in said securing component (7), along said predetermined separation plane (S.S), and spaced apart from one another so as to form an alternating sequence of such oblong pre-cut zones (7.2) and non-pre-cut zones (7.1) which transmit mechanical forces between said elements (8,9); and
said pyrotechnic rupture device (1) is arranged such that:
in each of said non-pre-cut zones (7.1) of said securing component (7), said pyrotechnic rupture device (1) comprises a section (1.1) in which the corresponding section (2.1) of the detonating cord is arranged in an expansion tube (3), and
in each of said pre-cut oblong zones (7.2) of said securing component (7), said pyrotechnic rupture device (1) comprises a section (1.2) in which the corresponding section (2.2) of the detonating cord is enclosed in a sealed manner in an inflatable sheath (5).

2. Method according to claim 1, wherein, in sections (1.2) of the pyrotechnic rupture device (1) corresponding to said pre-cut oblong zones (7.2) of said securing component (7), a deflagrating cord (6) which is enclosed in a sealed manner in said inflatable sheath (5) is arranged around said section (2.2) of detonating cord.

3. Pyrotechnic rupture securing component for securing two elements (8,9) between them, wherein said component (7):
is intended to transmit mechanical forces between said elements (8,9) as required, and
comprises a pyrotechnic rupture device (1) which has a detonating cord (2), is incorporated into said securing component (7) and able to break the latter along a predetermined separation plane (S.S) when said elements (8,9) have to be separated from one another, wherein
said securing component (7) comprises, along said predetermined separation plane (S.S), an alternating sequence of oblong pre-cut zones (7.2) and non-pre-cut zones (7.1) which transmit mechanical forces between said elements (8,9); and
said pyrotechnic rupture device (1) comprises:
in each of said non-pre-cut zones (7.1), a section of detonating cord (2.1) arranged in an expansion tube (3), and in each of said pre-cut oblong zones (7.2), a section of detonating cord (2.2) enclosed in a sealed manner in an inflatable sheath (5).

4. Pyrotechnic rupture securing component according to claim 3, wherein, in said pre-cut oblong zones (7.2), said pyrotechnic rupture device (1) comprises a deflagrating cord (6) which is enclosed in a sealed manner in said inflatable sheath (5) and which is arranged around the corresponding section (2.2) of the detonating cord.

5. Pyrotechnic rupture securing component according to claim 3, comprising two wings (13,14) defining between them a groove (16) in which said pyrotechnic rupture device (1) is housed, said groove (16) being closed, on the side of one (8) of said elements (8,9), by a bottom (17) and, on the side of the other (9) of said elements (8,9), by this other element (9) itself, and said wings (13,14) comprising, in the vicinity of said bottom (17), pre-established rupture zones (18,19) defining said predetermined separation plane (S.S), wherein, in said pre-cut oblong zones (7,2), each of said wings (13,14) comprises an oblong opening (20,21) at the level of said pre-established rupture zones (18,19) and of said bottom (17) of the groove (16).

6. Profile for the pyrotechnic rupture component from claim 5, the profile comprising two wings (13,14) defining between them a groove (16) which, on one side, is closed by a bottom (17) and, on the other, is open, said wings (13,14) comprising in the vicinity of said bottom (17) pre-established rupture zones (18,19), wherein, each of said wings (13,14) comprises a sequence of spaced oblong openings (20, 21) at the level of said pre-established rupture zones (18,19) and of said bottom (17) of the groove (16), and each oblong opening of one of said wings is opposite an oblong opening of the other of said wings.

7. Pyrotechnic rupture device having a detonating cord for the component according to claim 3, comprising, alternately, sections (1.1) in which the detonating cord (2.1) is arranged in an expansion tube (3) and sections (1.2) in which the detonating cord (2.2) is enveloped, in a sealed manner, in an inflatable sheath (5).

8. Pyrotechnic rupture device according to claim 7, wherein the sections (1.2) having an inflatable sheath (5) each comprise an explosive cord (6) arranged inside said inflatable sheath, around said detonating cord (2.2).

\* \* \* \* \*